United States Patent
New

(10) Patent No.: US 7,862,239 B2
(45) Date of Patent: Jan. 4, 2011

(54) TILTING PAD THRUST BEARING

(75) Inventor: Nigel Henry New, Middlesex (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 491 days.

(21) Appl. No.: 11/998,293

(22) Filed: Nov. 29, 2007

(65) Prior Publication Data

US 2008/0131042 A1    Jun. 5, 2008

(30) Foreign Application Priority Data

Dec. 1, 2006    (GB)    ................. 0623992.5

(51) Int. Cl.
*F16C 17/06* (2006.01)
*F16C 32/06* (2006.01)

(52) U.S. Cl. ................. 384/122; 384/117; 384/307; 384/318; 384/312

(58) Field of Classification Search ................. 384/105, 384/122, 224, 247, 251, 303, 308–309, 312
See application file for complete search history.

(56) References Cited

U.S. PATENT DOCUMENTS

| | | | |
|---|---|---|---|
| 1,293,471 A | 2/1919 | Kingsbury | |
| 1,445,188 A | 2/1923 | Wadsworth | |
| 2,026,757 A | 1/1936 | Swanstrom | |
| 2,374,548 A | 4/1945 | Leisure | |
| 3,246,936 A | 4/1966 | Carle | |
| 4,227,752 A * | 10/1980 | Wilcock | 384/106 |
| 4,335,925 A * | 6/1982 | Stopp | 384/125 |
| 4,456,391 A * | 6/1984 | New | 384/307 |
| 4,501,505 A * | 2/1985 | Chambers | 384/152 |
| 4,871,267 A * | 10/1989 | Gu | 384/105 |
| 5,007,745 A * | 4/1991 | Ball et al. | 384/307 |
| 5,068,965 A * | 12/1991 | Ball et al. | 29/898.041 |
| 5,503,479 A * | 4/1996 | Ide | 384/122 |
| 5,567,057 A * | 10/1996 | Boller | 384/122 |
| 5,971,616 A * | 10/1999 | New | 384/122 |
| 6,354,741 B1 * | 3/2002 | Saville et al. | 384/124 |
| 6,443,621 B1 * | 9/2002 | New | 384/308 |
| 6,746,152 B2 * | 6/2004 | Branagan | 384/122 |
| 7,238,066 B2 * | 7/2007 | Taylor et al. | 440/38 |

(Continued)

FOREIGN PATENT DOCUMENTS

GB    1535165 A  *  12/1978

(Continued)

*Primary Examiner*—Marcus Charles
(74) *Attorney, Agent, or Firm*—Ryan Kromholz & Manion, S.C.

(57) ABSTRACT

A tilting pad thrust bearing is described including a substantially solid flat carrier body, a plurality of bearing pads, and an intermediate component which is disposed in the assembled bearing between the bearing pads and the carrier body, the intermediate component providing a plurality of fulcrum means corresponding in number to the bearing pads and being angularly orientated such that the fulcrum means are disposed beneath the bearing pads. The arrangement is designed such that the intermediate component includes at least one of an annular hub portion and an annular rim portion from which a plurality of ribs project outwardly or inwardly thereof and on which individual bearing pads are arranged to be seated to pivot thereon, the ribs thus providing the fulcrum means, and in that a locating component is provided which also includes at least one of a hub portion and a rim portion.

14 Claims, 2 Drawing Sheets

U.S. PATENT DOCUMENTS

| | | | | |
|---|---|---|---|---|
| 7,311,445 B2 * | 12/2007 | New | ............................ | 384/117 |
| 7,682,084 B2 * | 3/2010 | Yoshimura et al. | ............ | 384/306 |
| 2003/0012468 A1 * | 1/2003 | New | ............................ | 384/312 |
| 2003/0021503 A1 * | 1/2003 | Branagan | ..................... | 384/308 |

FOREIGN PATENT DOCUMENTS

| | | | |
|---|---|---|---|
| GB | 2308162 A | * | 6/1997 |
| GB | 2444267 A | * | 6/2006 |
| WO | WO 95/16863 | | 6/1995 |

* cited by examiner

TILTING PAD THRUST BEARING

RELATED APPLICATION

This application claims the benefit of co-pending United Kingdom Patent Application No. GB0623992.5, filed 1 Dec. 2006.

FIELD OF THE INVENTION

This invention relates to a tilting pad thrust bearing for apparatus having a rotating shaft which carries a thrust load.

BACKGROUND OF THE INVENTION

Tilting pad thrust bearing arrangements are well known per se, having discrete bearing pads and against which the pads bear to transmit axial thrust forces.

The supporting carrier means is formed either as a metal ring of such thickness as to support the thrust loads without deformation or sometimes as a prepared surface of the apparatus housing the bearing arrangement. In either case it is conventional for the pad-supporting face of the carrier means to be substantially flat in the axial direction, except possibly for lubricant nozzles at the surface, and for the face of each thrust pad opposite to a bearing surface to be machined away except at a central or circumferentially off set location to leave a radially-extending fulcrum ridge by way of which the pad is supported on said supporting face of the carrier means and about which fulcrum ridge it is able to make limited tilting movement.

It will be appreciated that in the case of individual pads or an integral ring of such pads, the provision of such fulcrum ridge on the supported pad surfaces involves an additional and nontrivial manufacturing stage.

GB-A-1535165 describes a thrust bearing arrangement wherein parallel surfaced bearing pads are supported on a smooth faced carrier by way of an intervening plate machined such that it presents an upstanding fulcrum ridge to each bearing pad. Whereas this construction permits the bearing pads to be of simpler and cheaper construction, the machined plate nevertheless requires considerable manufacturing effort.

GB2308162 describes an alternative arrangement wherein, and having regard to FIGS. 1 and 2 hereof, the bearing assembly 400 comprises an annular body 106 which carries an array of bearing pads 402, either as discrete pads or in an integral ring of pads separated by webs of pad material. The pads are manufactured with opposite faces flat and the fulcrum ridges are provided at 415 by a shim member 412 in the form of a thin circular disc of material in which a series of cuts are made to allow for a plurality of tabs 416 thus defined to be folded back on themselves about generally radial fold lines. In this manner are a plurality (usually 6, 8, or possibly 10) of fulcrum ridges defined in the regions of the shim member which are now of double thickness. It is on these that the bearing pads are loosely held in place such that they are capable of tilting when the bearing is assembled. To complete the assembly, the shim member, having the fulcrum ridges formed therein and having immediately adjacent "letter box" apertures resulting from the folding of the shim material on top of itself, is disposed between the pads and a correspondingly flat surface of the body 106. By such means may the bearing pads be manufactured without any expensive additional machining to define fulcrum ridges integrally thereon, and additionally, the provision of a shim member in which a discrete number of folds have been effected further allows for cost reduction, again because there is no requirement for machining of the shim member.

Notwithstanding the above, there is still requirement for the each and every shim member to be worked, and therefore the cost reduction by minimizing work for individual pads is effectively negated.

It is an object of this invention to provide a tilting pad thrust bearing which minimizes both machining and working on all of the components in the bearing, and thus concomitantly provides a bearing of minimal cost.

SUMMARY OF THE INVENTION

According to the invention there is provided a tilting pad thrust bearing comprising a substantially solid flat carrier body, a plurality of bearing pads, and an intermediate component which is disposed in the assembled bearing between the bearing pads and the carrier body, the intermediate component providing a plurality of fulcrum means corresponding in number to the bearing pads and being angularly orientated such that the fulcrum means are disposed beneath the bearing pads, characterized in that the intermediate component includes at least one of an annular hub portion and an annular rim portion from which a plurality of ribs project outwardly or inwardly thereof and on which individual bearing pads are arranged to be seated to pivot thereon, the ribs thus providing the fulcrum means, and in that a locating component is provided which also includes at least one of a hub portion and a rim portion from which a plurality of ribs project to define a plurality of regions of a size and shape which permits the bearing pads to be loosely received therein.

In the interests of clarity, "loosely" in the above and hereinafter is taken to mean providing some resistance to the tendency of the bearing pad to be displaced circumferentially and radially during use while nevertheless permitting some pivoting of the bearing pad on the rib of the intermediate component beneath it. Also, for the avoidance of doubt, the rim and hub portions of the locating component may be discontinuous, and this is also possible in the case where the intermediate component is provided with both hub and rim portions.

Preferably at least one of the locating component and the bearing pads has means which project so as to be capable of engaging the other, by which engagement the axial displacement away from the carrier body is restricted.

Preferably the intermediate component includes both a hub portion and a rim portion, connected by the ribs.

Preferably the locating component includes both a hub portion and a rim portion between which ribs extend to define apertures in the locating component which receive the bearing pads.

Preferably the ribs if the intermediate component project radially outwardly from the hub portion and/or inwardly of the rim portion of the intermediate component. Alternately, the ribs of the intermediate component are offset from a truly radial orientation.

Preferably, the intermediate component includes both a hub portion and a rim portion, connected by the ribs.

In one embodiment, the ribs project radially outwardly from the hub portion and/or inwardly of the rim portion of the intermediate component, and in an alternative embodiment, the ribs are offset from this position such that the arrangement of the ribs is not purely radial but also slightly tangential with respect to each of the hub and rim portions of the intermediate component.

In a preferred embodiment, the angular orientation of the locating component and the intermediate component is such that the ribs of the latter effectively bisect the apertures defined between the ribs of the locating component. In this arrangement, the bearing pads are effectively pivoted along a line which bisects them. In an alternative embodiment, the intermediate component is angularly offset from this position so as to provide the bearing pads with a higher load capacity when the surface against which the thrust bearing acts is rotating in one direction or the other.

Preferably, the locating component and the bearing pads cooperate by providing the bearing pads with one or more peripheral lips around their base to increase the peripheral dimensions thereof to an extent that the lip(s) cannot pass through the apertures defined in the locating component, but the bearing pad body is not prevented from doing so.

Most preferably, the locating ring, and further preferably the intermediate component are both cut from sheet steel, preferably by laser means. Alternatively, such components may be stamped, punched or cut by water jet. In any event, the important factors in their manufacture is first their inherent inexpensiveness, and second their ease of manufacture, i.e. no further processing of the item is required once it has been made. Preferably, all the components of the bearing are laser cut, or stamped from stock sheet material.

Preferably each of the carrier body, the intermediate component and the locating component of the assembly is provided with secondary apertures through which fixings pass in the assembly to angularly orientate the components correctly with respect to one another, and also to clamp the components, excepting the bearing pads, together so as to prevent any relative axial displacement thereof but nevertheless allowing the bearing pads to pivot and/or be slightly axially displaced.

Most preferably the fixings used are of the type which preclude the need for the secondary apertures to be tapped, examples being clinch nuts or hank bushes, which are interferingly or weldably secured to the locating component, and allow for threaded fixing members to pass through the secondary apertures in the carrier body and intermediate component and be received in the tapped bore of the nut or bush during assembly.

In a most preferred embodiment, the rear surface of the carrier body, being on the opposite side of that on which the other components of the assembly are provided, is countersunk or counter-bored in the region of the secondary apertures to allow the bolt heads to be flush with or beneath the rear surface of the carrier body.

Preferably, the nut or bush of the fixing ensures that the locating component and the intermediate component are axially separated from one another by a desired amount, for example by means of a shank portion provided on the nut or bush which extends through the secondary apertures of the locating component by the desired amount, the shank having an internally tapped bore in which a threaded fixing may be received.

In a further preferred embodiment, one or other or both of the locating component and the intermediate component are split into two or more parts.

There are many advantages to the arrangement described above, but the primary advantages are the bearings relative low cost, as the parts are laser cut or stamped and assembled as sandwich. Additionally, the manufacturing process allows for flexibility in that small or large production runs can be conducted without great process alterations.

In terms of the manner in which the bearing is assembled, the provision of Clinch Nuts or Hank Bushes fitted in the top plate with screws through from the base plate prevents the screws from coming loose and escaping into the bearing area. Also, no drilling and tapping is required, and the only machining which may be required is the counter-sinking or counter-boring on the rear surface of the carrier body to accept the screw heads.

Although this invention potentially provides a bearing which requires no machining, some machining may inevitably be required as a result of customer requests. For example, while currently used polymer bearing pads may sit well on an 'as cut' carrier body and intermediate component, steel pads (and this invention extends to cover the use of such) may require the carrier body to be plough ground flat and parallel because of the higher stiffness of the pads. Also, outer and inner diameter portions of carrier body, intermediate component and locating component may be machined to improve the overall aesthetic appearance of the assembly.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
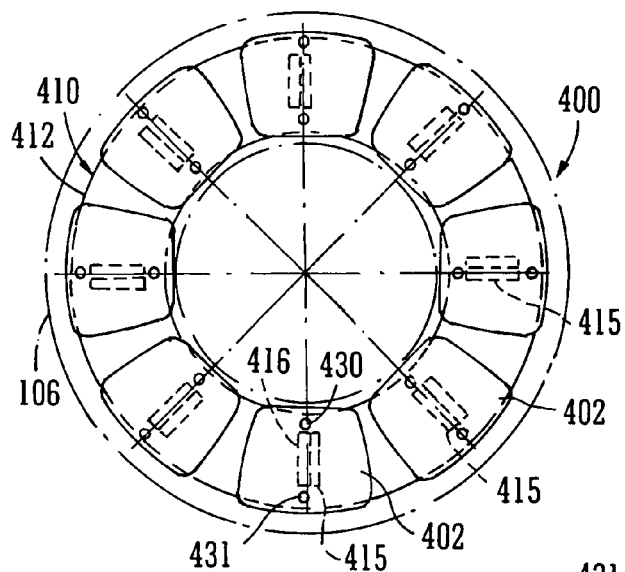
FIGS. 1 & 2 provide respectively end and sectional elevations of the prior art bearing described in GB2308162.
Figure 2:
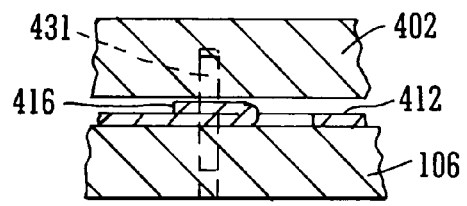
Figure 3:
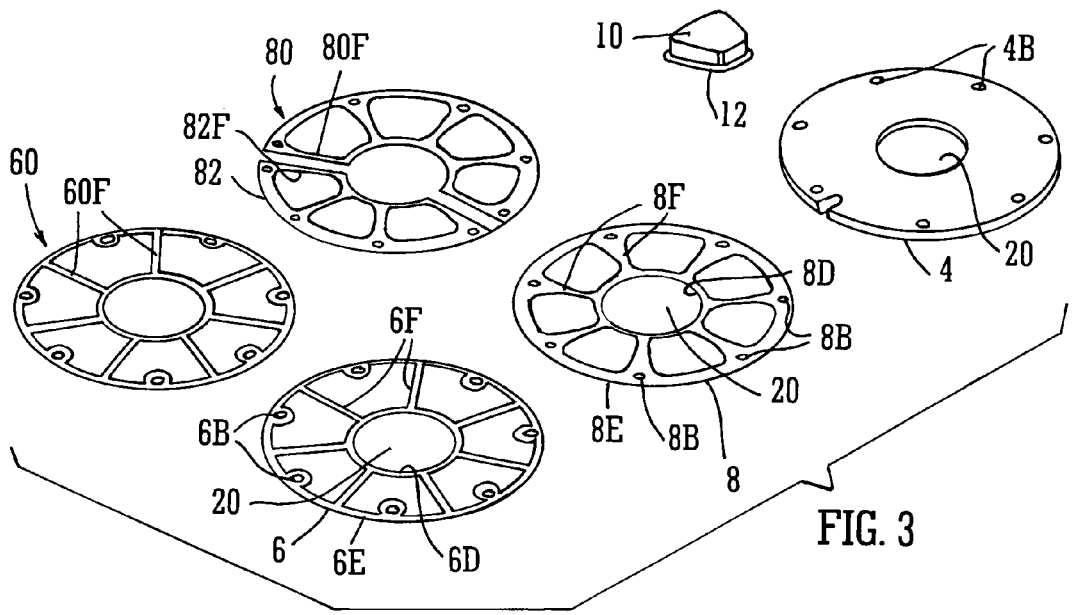
FIG. 3 shows perspective views of the different components used in the assembly of the present invention, with possible alternatives.

Referring first to FIG. 3, there is shown a generally circular, laser machined and generally solid carrier body 4, an intermediate component 6, and a locating component 8, the latter two components forming the substance of the invention in that bearing pads, one of which is shown at 10, are arranged in the apertures defined in the locating component 8 which is disposed on top of the intermediate component 6 such that ribs are disposed beneath each of the bearing pads to act as fulcrums therefore. All of the locating component 8, the intermediate component 6, and the carrier body 4 are provided with secondary fixing apertures 8B, 6B, 4B which are aligned to receive suitable fixing members, in the form of screws or bolts which pass through from the rear surface of the carrier body 4 and into hank bushes or clinch nuts, being commonly available items, which are secured to the upper surface of the locating component 8

Each of the intermediate and locating components 6, 8, are provided with generally circular central hub portions 6D, 8D, outer rim portions 6E, 8E, each of which is joined by the same number of ribs 6F, 8F. The apertures defined by the respective portions of the locating component receive the bearing pads 10, whereas it is the ribs 6F of the locating component which provide the functional fulcrum means important to this invention. It is on the ribs 6F which the bearings pivot in use, the apertures defined on either side being irrelevant except from the point of view of providing spaces on either side of the rib into which the bearing can rock about the rib 6F. Accordingly, to achieve the desired effect, the locating component and the intermediate component are angularly displaced relative to one another such that the ribs of one component effectively bisect the apertures of another.

In an alternative embodiment, the relative angular displacement of the two components may be different to accommodate different bearing configurations wherein the resistance to bearing pad pivoting in one direction is greater than the opposite direction, such as when a shaft (not shown) of the apparatus in which the bearing assembly is provided, and which is intended to pass through the inner aperture 20 of the various components, rotates more frequently in a particular direction.

Alternative configurations for the intermediate component 60 and locating component 80, 82 are also shown in the FIG. 3. In these configurations, the locating component is provided in two separate parts 80, 82, and the intermediate component 60 is provided with angularly offset ribs 60F. Such angular offset can be best described by performing a notional angular/circumferential displacement of the rim portion relative to the hub portion such that the ribs are no longer perfectly radially aligned, but also possess some tangential orientation relative to the inner hub and outer rim portions of the component.

In each case, the secondary fixing apertures of each component are still aligned during assembly, and the bearing pads are still received in the apertures defined in each part of the components 80, 82 which together form the locating component as a whole. It is to be mentioned that the angular position of the apertures defined in the locating components 80, 82 may be slightly less spaced apart from one another to allow for the adjacent rib portions 80F, 82F.

Figure 4:
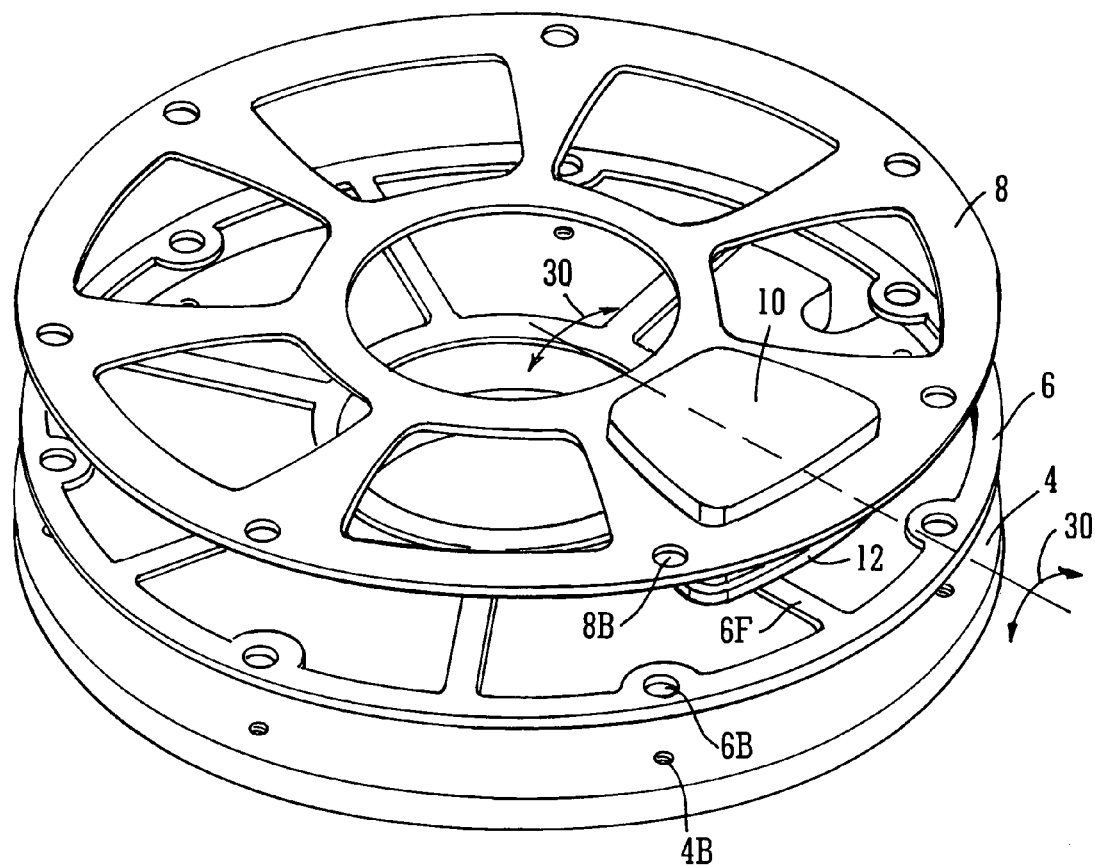
FIG. 4 shows an exploded perspective view of the bearing assembly in its partially assembled condition.

It will also be noted from the figure that the bearing pad 10 is provided with a lip 12 which in use prevents the bearing pad from escaping from its position within the apertures defined in the locating component 8/80-82. This feature can be better understood with regard to FIG. 4, in which the angular alignment of the various components is clearly shown such that the secondary apertures 4B, 6B, 8B are all aligned ready to receive the fixings.

In this Figure, a single bearing pad 10 is shown being superposed on a rib 6F so as to be capable of rocking thereon as shown by the arrows 30. Also, it will be understood that there is a dimensional requirement of both bearing pad lip 12 and the intermediate component 6 which is that the relative sizes of
- the lip 12 foot print,
- the radial distance between the inner hub and outer rim portion of the intermediate component, and
- the inner and out radial dimension of the intermediate component, must be such that neither the inner hub or outer rim portions of the intermediate component must interfere with the lip portion of the bearing pad as this would prevent free pivoting of the bearing pad.

Also, as can be seen from the dotted line in the Figure, the pivot axis for the bearing pad 10 is defined by the radially disposed rib 6F. Any angular displacement or offset of this rib will provide the bearing pad with a different pivot axis, and additionally different pivot characteristics and resistances, depending on the direction and extent of the offset.

I claim:

1. A tilting pad thrust bearing comprising:
 a substantially solid flat carrier body;
 a plurality of bearing pads; and
 an intermediate component which is disposed between the bearing pads and the carrier body, said intermediate component providing a plurality of fulcrum means corresponding in number to the bearing pads and being angularly orientated such that the fulcrum means are disposed beneath the bearing pads, characterized in that
 the intermediate component includes at least one of an annular hub portion and an annular rim portion from which a plurality of ribs project outwardly or inwardly thereof and on which individual bearing pads are arranged to be seated to pivot thereon, said ribs thus providing the fulcrum means, and in that
 a locating component is provided which also includes at least one of a hub portion and a rim portion from which a plurality of ribs project to define a plurality of regions of a size and shape which permits the bearing pads to be loosely received therein.

2. A bearing according to claim 1 wherein at least one of said locating component and said bearing pads has means which project so as to be capable of engaging the other, by which engagement the axial displacement away from the carrier body is restricted.

3. A bearing according to claim 2 wherein the bearing pads are provided with one or more peripheral lips around their base to increase the peripheral dimensions thereof to an extent that said lip(s) cannot be axially displaced through the regions defined in the locating component, the remaining body of the bearing pad not being prohibited from so doing.

4. A bearing according to claim 1 wherein the intermediate component includes both a hub portion and a rim portion, connected by the ribs.

5. A bearing according to claim 1 wherein the locating component includes both a hub portion and a rim portion between which ribs extend to define apertures in said locating component which receive said bearing pads.

6. A bearing according to claim 1 wherein the ribs of the intermediate component project radially outwardly from the hub portion and/or inwardly of the rim portion of the intermediate component.

7. A bearing according to claim 1 wherein the ribs of the intermediate component are offset from a truly radial orientation.

8. A bearing according to claim 1 wherein at least one of: the locating component, the intermediate component and the carrier body are cut, stamped or punched from sheet material.

9. A bearing according to claim 1 wherein each of the carrier body, the intermediate component and the locating component of the assembly is provided with secondary apertures through which fixings pass in the assembly to angularly orientate the components correctly with respect to one another.

10. A bearing according to claim 9 wherein the fixings consist of a threaded bolt part and a nut part, said nut part being tapped to receive the threaded bolt part and being secured to the locating component, said threaded bolt part passing through the secondary apertures of the carrier plate and the intermediate component before being threadingly received in said nut part to fix the assembly together.

11. A bearing according to claim 10 wherein the rear surface of the carrier body, being on the opposite side of that on which the other components of the assembly are provided, is counter-sunk or counter-bored in the region of said secondary apertures to allow the heads of the bolt parts of the fixings to be flush with or beneath the rear surface of said carrier body.

12. A bearing according to claim 1 wherein the angular orientation of the locating component and the intermediate component is such that the ribs of the latter effectively bisect the apertures defined between the ribs of the locating component.

13. A bearing according to claim 1 wherein the angular orientation of the locating component and the intermediate component is such that the ribs of the latter are disposed more proximate one side of the corresponding aperture or region in the locating component than the other.

14. A bearing according to claim 1 wherein one or other or both of the locating component and the intermediate component are split into two or more parts.

* * * * *